United States Patent
Yang et al.

(10) Patent No.: US 10,388,979 B2
(45) Date of Patent: Aug. 20, 2019

(54) METHOD OF MANUFACTURING A FUEL CELL STACK

(71) Applicant: GM GLOBAL TECHNOLOGY OPERATIONS LLC, Detroit, MI (US)

(72) Inventors: Xi Yang, Bloomfield Hills, MI (US); Liang Xi, Northville, MI (US); Jeffrey A Rock, Rochester Hills, MI (US); Siguang Xu, Rochester Hills, MI (US); Yeh-Hung Lai, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 15/586,514

(22) Filed: May 4, 2017

(65) Prior Publication Data

US 2018/0323463 A1    Nov. 8, 2018

(51) Int. Cl.
*H01M 8/2404* (2016.01)
*H01M 8/242* (2016.01)
*H01M 8/1018* (2016.01)

(52) U.S. Cl.
CPC .......... *H01M 8/2404* (2016.02); *H01M 8/242* (2013.01); *H01M 2008/1095* (2013.01)

(58) Field of Classification Search
CPC ............... H01M 8/2404; H01M 8/242; H01M 2008/1095
See application file for complete search history.

(56) References Cited

U.S. PATENT DOCUMENTS

| | | | |
|---|---|---|---|
| 6,218,039 B1 * | 4/2001 | Mease | H01M 8/247 29/623.2 |
| 6,833,211 B1 | 12/2004 | Yang | |
| 2003/0203269 A1 * | 10/2003 | Rock | H01M 8/2475 429/535 |
| 2005/0095485 A1 * | 5/2005 | Saulsbury | H01M 8/0206 429/430 |
| 2008/0206617 A1 | 8/2008 | Okada et al. | |
| 2016/0013508 A1 * | 1/2016 | Martinchek | H01M 8/2475 429/469 |

* cited by examiner

*Primary Examiner* — Muhammad S. Siddiquee
(74) *Attorney, Agent, or Firm* — Quinn IP Law

(57) ABSTRACT

A method for assembling a fuel cell stack for a vehicle is provided wherein the method includes the steps of: (1) providing a batch of fuel cells having varying active area thicknesses among each fuel cell; (2) measuring an active area thickness for each fuel cell in the batch of fuel cells and sorting each fuel cell in the batch of fuel cells into one of a first group, a second group, and a third group based on the active area thickness for each fuel cell; (3) assembling a target number of fuel cells to a target height from at least one of the first, second and third groups onto a first end plate; and (4) affixing a second end plate to the target number of fuel cells and the first end plate thereby creating a fuel cell stack.

17 Claims, 9 Drawing Sheets

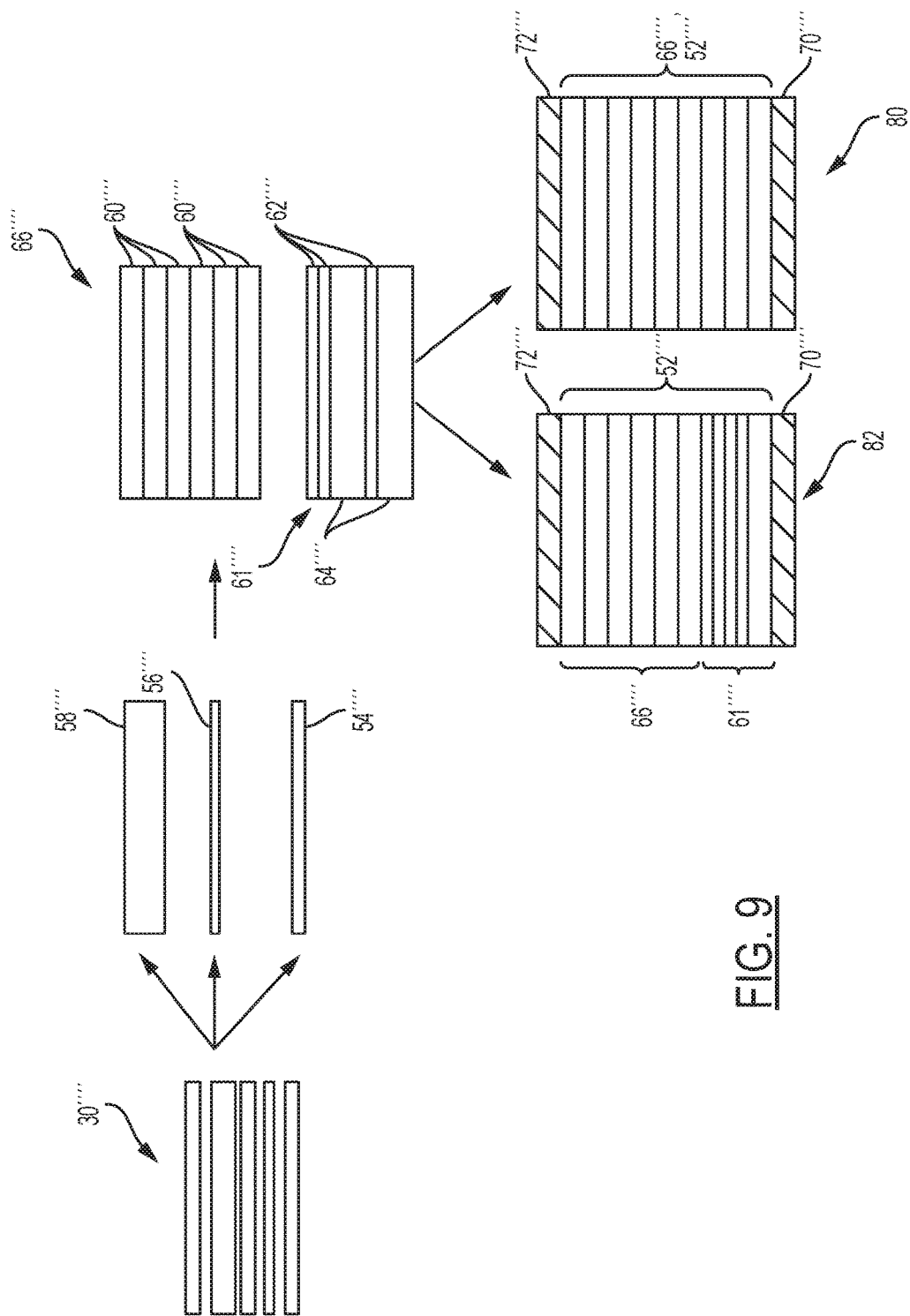

METHOD OF MANUFACTURING A FUEL CELL STACK

TECHNICAL FIELD

The present disclosure relates to fuel cells stacks used in vehicles, and more specifically, to a method of assembling a fuel cell stack which provides for improved efficiency.

BACKGROUND

The following present disclosure is provided in relation to Proton Exchange Membrane (PEM) fuel cell stacks. The method of manufacture may also be used for other types of fuel cell stacks such as SOFC fuel cell stacks, Molten Carbonate Fuel Cells (MCFC) or Direct Methanol Fuel Cells (DMFC). Further, the present disclosure can also be used for electrolysis cells such as Solid Oxide Electrolysis Cells and such cell stacks. The electro-chemical reactions and the function of a fuel cell or an electrolysis cell is not the essence of the present invention, thus this will not be explained in detail, but considered known for a person skilled in the art.

In a traditional fuel cell stack 114 (as shown in FIG. 1A), a plurality of fuel cell units 112 and traditional flat end plates 110 are assembled to form a stack 114. It is understood that a UEA 116 may be disposed onto a bipolar plate thereby forming a fuel cell 118 among the other similarly constructed fuel cells 118 additional fuel cells are schematically represented by phantom lines 115. The UEA 116 may include diffusion mediums (also known as a gas diffusion layer) disposed adjacent to an anode face and a cathode face of a membrane electrolyte assembly (MEA). The MEA includes a thin proton-conductive, polymeric, membrane-electrolyte having an anode electrode film formed on one face thereof, and a cathode electrode film formed on the opposite face thereof. In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder.

The efficiency of the fuel cell stack 114 is dependent on small contact resistance between the various UEA's 116 and bipolar plates. The compression forces 132 must be large enough and evenly distributed throughout the length 130 of the fuel cell stack 114 to ensure electrical contact between each fuel cell 118, but not so significant such that excessive compression forces 132 damage the electrolyte, the electrodes, the electrical interconnect or impedes the gas flow over the active areas 116. The compression of the fuel cell stack 114 is also vital for the seal between the layers of the stack to keep the stack gas tight. However, it is rather common to find varying compression forces 132 along the length 130 of the fuel cell stack 130 resulting in inefficient fuel cell stack 114 operation.

Under this scenario, excessively high compression forces 132 may occur at certain regions within a stack 114 while inadequate compression forces 132 may occur at other regions within the same stack. As indicated, unevenness across the stack can lead to damage or reduced performance of the fuel cell stack. Accordingly, there is a need to provide a method to manufacture a robust fuel cell stack which evenly distributes the loads (compression forces 132) along the length of the fuel cell stack from one end plate to the other end plate.

The above information disclosed in this Background section is only for enhancement of understanding of the background of the invention, and therefore, it may contain information that does not form the prior art that is already known in this country to a person of ordinary skill in the art. Accordingly, there is a need for an improved end plate unit for a fuel cell stack which better distributes compression loads across the fuel cell stack.

SUMMARY

The present disclosure provides for a method for manufacturing a fuel cell stack having substantially even compression loads between the various fuel cells in the fuel cell stack. A first embodiment method includes the steps of: (1) providing a batch of fuel cells each fuel cell in the batch of fuel cells having an active area thickness and a tolerance for the active area thickness; (2) measuring an active area thickness for each fuel cell in the batch of fuel cells and sorting each fuel cell in the batch of fuel cells into one of a first group, a second group, and a third group based on the active area thickness for each fuel cell; (3) assembling a target number of fuel cells to a target height from at least one of the first, second and third groups onto a first end plate; and (4) affixing a second end plate to the target number of fuel cells and the first end plate thereby creating a fuel cell stack. In the first embodiment, the step of measuring and sorting includes the step of directing a nominal fuel cell to the first group, directing a thin fuel cell to the second group, and directing a thick fuel cell to the third group.

It is understood that the step of assembling the target number of fuel cells may, but not necessarily, include the step of alternating thick and thin fuel cells onto the first end plate. Alternatively, the step of assembling the target number of fuel cells may include the step of providing thick, nominal and thin fuel cells in a repeated consecutive pattern onto the first end plate. In yet another alterative manner, the step of assembling the target number of fuel cells may include the step of providing a plurality of nominal fuel cells adjacent to one another onto the first end plate.

A second embodiment method of the present disclosure includes the steps of: (1) providing a batch of fuel cells, each fuel cell in the batch of fuel cells having an active area thickness and a tolerance for the active area thickness; (2) measuring an active area thickness for each fuel cell in the batch of fuel cells and sorting each fuel cell into one of a first group, a second group, and a third group; (3) assembling a first plurality of fuel cells from any one of the first, second and third groups onto a first end plate until at least one of the first, second and third groups is depleted; (4) assembling a second plurality of fuel cells to the first plurality of fuel cells until a target number of fuel cells is achieved, the second plurality of fuel cells being formed from any one of the first, second and third groups of fuel cells; and (5) affixing a second end plate to the first plurality of fuel cells and the first end plate thereby creating a fuel cell stack.

In the second embodiment, the second plurality of fuel cells may be formed from alternating thin and thick fuel cells, and the second plurality of fuel cells is composed of nominal fuel cells. Alternatively, in the second embodiment the first plurality of fuel cells may be formed solely from a plurality of nominal fuel cells, and the second plurality of fuel cells may be formed from at least one of a thin fuel cell and a thick fuel cell. Where thin and thick fuel cells are implemented in the second plurality of fuel cells, the thin and thick fuel cells may be arranged in a repeated consecutive pattern—where the thin and thick fuel cells are arranged in an alternating manner.

A third embodiment method of the present disclosure includes the steps of: (1) providing a batch of fuel cells each fuel cell having an active area thickness and a tolerance for the active area thickness; (2) measuring an active area thickness for each fuel cell in the batch of fuel cells and sorting each fuel cell into one of a first group, a second group, and a third group; (3) randomly assembling a first plurality of fuel cells from any one or more of the first, second and third groups onto a first end plate until at least 50 percent of a target fuel cell number is achieved; (4) selectively assembling a second plurality of fuel cells to the first plurality of fuel cells until 100 percent of the target number of fuel cells is achieved and a target height is achieved, the second plurality of fuel cells being formed from one or more fuel cells from each the first, second and third groups of fuel cells; and (5) affixing a second end plate to the first plurality of fuel cells and the first end plate thereby creating a fuel cell stack.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIG. 9 is a schematic diagram illustrating example fuel cell stacks and the fuel cells assembled under the fourth embodiment manufacturing method.

Like reference numerals refer to like parts throughout the description of several views of the drawings.

DETAILED DESCRIPTION

Figure 1A:
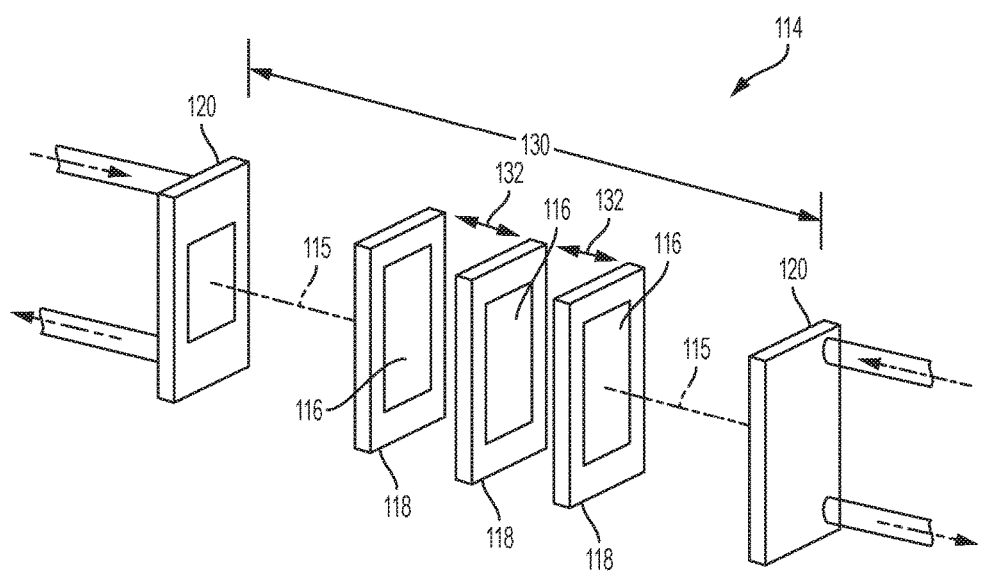
FIG. 1A is an expanded view of a traditional PEM fuel cell stack.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides for a method of manufacturing a fuel cell stack in accordance with various embodiments wherein the compression forces between the fuel cells within the fuel cell stack are substantially equal and/or evenly distributed along the length 31 of the fuel cell stack 32. As shown in FIG. 1C, an expanded view of an example non-limiting fuel stack 32 is provided wherein each fuel cell 12 in the fuel stack 32 is assembled into the fuel stack 32 according to the active area thickness 14 of each fuel cell 12 as further described in the present disclosure. An example, but non-limiting active area thickness 14 (not including the bipolar plate) may fall in the range of 0.5 mm to 2 mm.

Figure 1B:
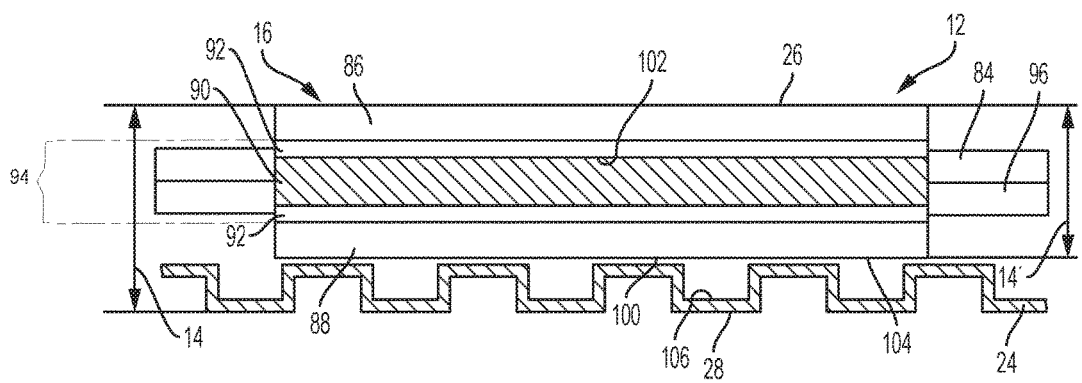
FIG. 1B is a schematic cross sectional view a fuel cell according to various embodiments of the present disclosure.
Figure 1C:
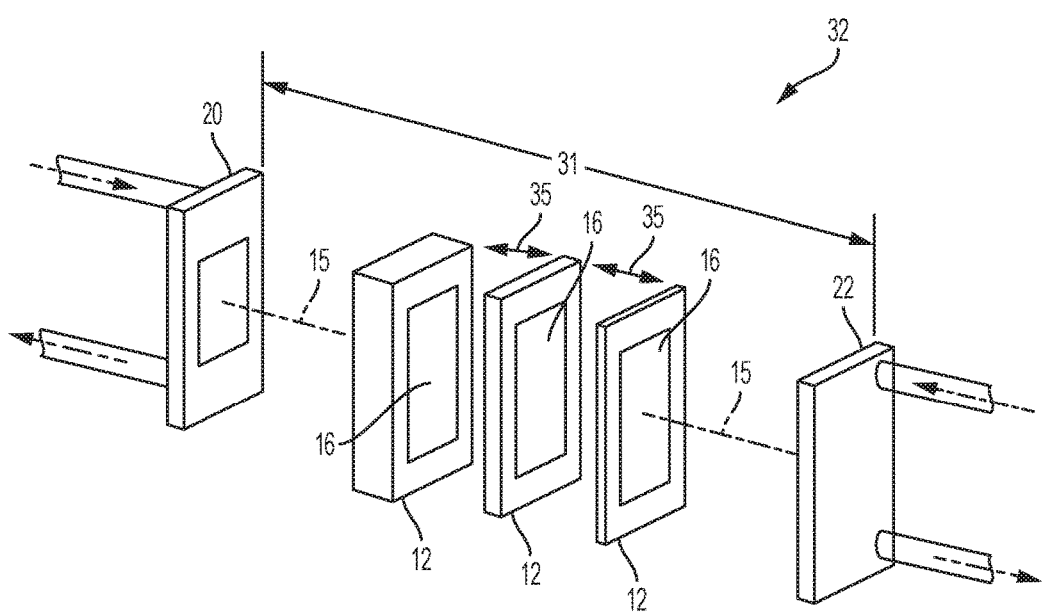
FIG. 1C is an expanded view of an example, non-limiting PEM fuel cell stack in accordance with the present disclosure.

With reference to FIG. 1B, a schematic cross sectional view of an example, non-limiting fuel cell 12 is shown in accordance with the present disclosure. Active area 16 is formed from a first gas diffusion layer 86, a center layer 94 (having both a membrane 90 and catalyst layers 92), and a second gas diffusion layer 88. The fuel cell thickness 14 is shown as the distance between a first side 26 of the first gas diffusion layer 86 (shown in FIGS. 1B and 1C) and a second side 28 of the bipolar plate 24. The example fuel cell 12 includes a membrane 90 with catalyst layers 92 forming the center layer 94. First sub-gasket is shown as element 84 and second sub-gasket is shown as element 96. Alternatively, the first and second sub-gaskets may be provided as a single sub-gasket. The active area thickness 14 may be defined as the distance between the second side 28 of the bipolar plate 24 and the first side 26 of the first gas diffusion layer 86.

It is understood that the active area thickness 14 may vary from one fuel cell 12 to another fuel cell 12 due to variations in the active area—center layer 94, first and second gas diffusion layers 86, 88. It is also understood that any variation that may occur in the bipolar plate 24 is minimal to none and therefore, alternatively, an alternative active area thickness 14' may also be measured as the distance between the first side 26 of the first gas diffusion layer 86 to the second side 104 of the second gas diffusion layer 88 as shown. It is further understood that the active area layers 16 may be disposed on any one of the first side 106 or the second side 28 of the bipolar plate 24. In the non-limiting example shown in FIG. 1C, the active area 16 is disposed on the 106 first side of the bipolar plate 24. Moreover, it is also understood that the term active area thickness 14, 14' in the present disclosure could be construed to mean either thickness 14 or thickness 14' as shown in the non-limiting example of FIG. 1C.

Figure 2:
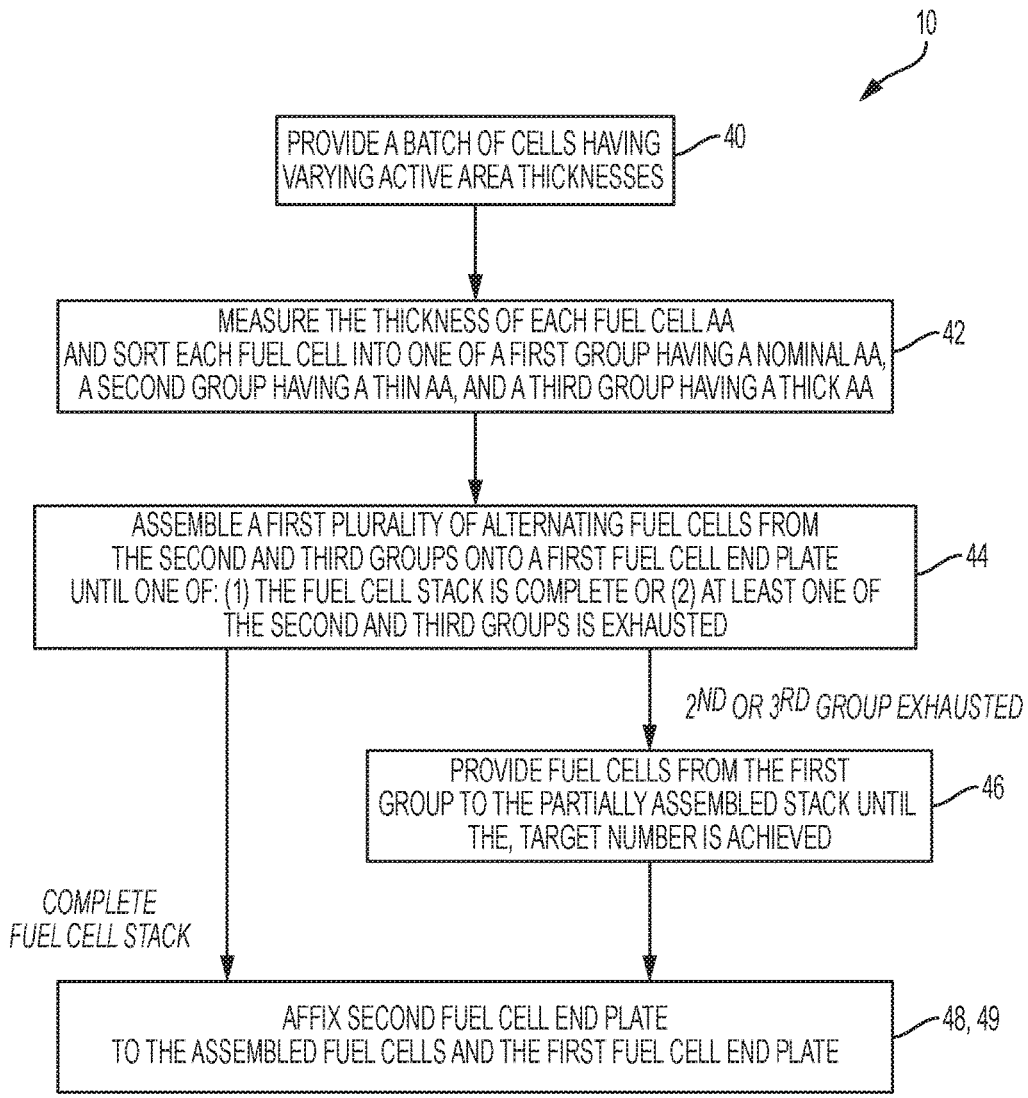
FIG. 2 is a flow chart which illustrates a first embodiment method of manufacturing a fuel cell stack in accordance with the present disclosure.

With reference to FIG. 2, a first embodiment manufacturing method 10 a fuel cell stack 32 (FIG. 1C) is shown in a flow chart. The first step 40 of the manufacturing method includes providing a batch of fuel cells having varying active area thicknesses. The second step 42 may include measuring the thickness of each fuel cell active area and sorting/directing each fuel cell into one of a first group having a nominal active area thickness, a second group having a thin active area thickness, and a third group having a thick active area thickness. It is understood that an example range for the first group (nominal active area thickness 14) may have a thickness tolerance 15 from about −10 μm to about 10 μm. That is, where the active area for the fuel cells in the first group could have a thickness tolerance 15 which could vary from −10 μm from the target active area thickness to as high as +10 μm relative to the target active area thickness. A non-limiting example range for the second group (thin active area thickness 14 where the tolerance 15 of the active area thickness may fall in the range from about −25 μm to about −10 μm relative to the target (or desired) active area thickness. That is, where the active area for cells in the second group could have a thickness which is so thin that it is −25 μm from the target thickness up to −10 μm from the target active area thickness. A non-limiting example range for the third group (thick active area thickness 14) may have a tolerance 15 from about 10 μm to about 25 μm relative to the target or desired active area thickness. Similarly, in the third group, the active area for cells in this third group could have a thickness which may be as low (or thin) as 10 μm thicker than the target thickness up to 25 μm thicker than the target active area thickness.

Figure 6:
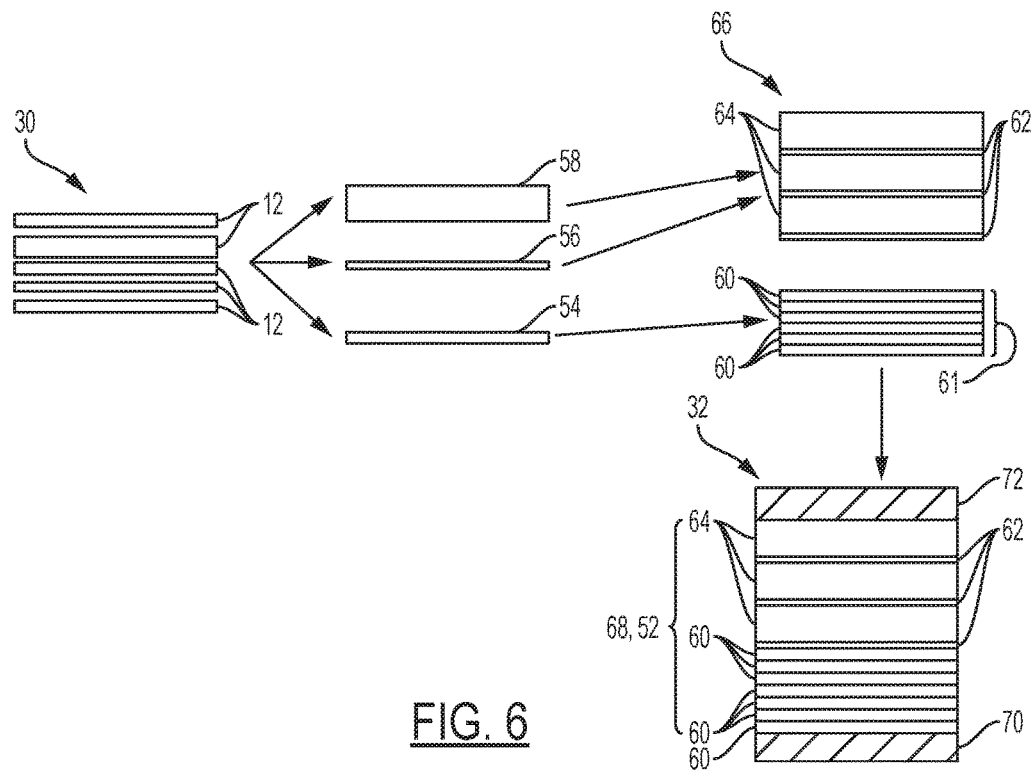
FIG. 6 is a schematic diagram illustrating an example fuel cell stack and the fuel cells assembled under the first embodiment method.

The third step 44 of the method includes assembling a plurality of alternating fuel cells 12 from the second (thin) and third (thick) groups onto a first fuel cell end plate as a first plurality of fuel cells until one of: (1) the target number of fuel cells have been assembled; or (2) at least one of the second (thin) and third (thick) groups is depleted of any fuel cells. It is understood that the target number 52 of fuel cells (shown in FIG. 6) may, but not necessarily, fall within the range of about 3 to about 100. With reference again to FIG. 6, a schematic diagram of the fuel cells 12 and fuel cell stack 32 is shown wherein at least one of the second and third groups is depleted. Therefore, where one of the second and third groups is depleted, then the fourth step 46 includes providing fuel cells from the first group (nominal) to the partially assembled stack until the fuel cell stack is complete, and a fifth step 48 would be implemented which involves affixing a second fuel cell end plate to the first plurality of fuel cells and the first fuel cell end plate. Alternatively, where the target number of fuel cells 12 have been assembled using the second and third groups, then the alternative fourth step 49 involves assembling the second fuel cell end plate to the plurality of fuel cells and the first fuel cell end plate.

Referring back to FIG. 6, as shown, the batch 30 of fuel cells 12 (having various active area thicknesses 14 and a tolerance 15 for each active area thickness) are divided into the first group (represented by element 54), the second group (represented by element 56), and the third group (represented by element 58). Fuel cells 12 are then selected from the first, second and third groups 54, 56, 58 as described above and assembled onto a first end plate 70 as a first plurality of fuel cells 66 until the target number 52 of fuel cells is achieved. As shown, thin fuel cells 62 come from the second group 56 and thick fuel cells 64 come from the third group 58. However, where at least one of the second group 56 and the third group 58 are depleted (no fuel cells 12 remaining in either groups 56, 58) before the target number 52 is achieved, then nominal fuel cells 60 from the first group 54 will be added as a second plurality 61 of fuel cells to the first plurality 66 of fuel cells until the target number 52 of fuel cells is achieved for the stack 32. This additional group of nominal fuel cells 60 form second plurality of fuel cells 61. Subsequently, as described above, the second end plate 72 is affixed onto the first and second plurality of fuel cells 66, 61 (assembled fuel cells 68) and the first end plate 70 as shown once the target number 52 is achieved.

Figure 3:
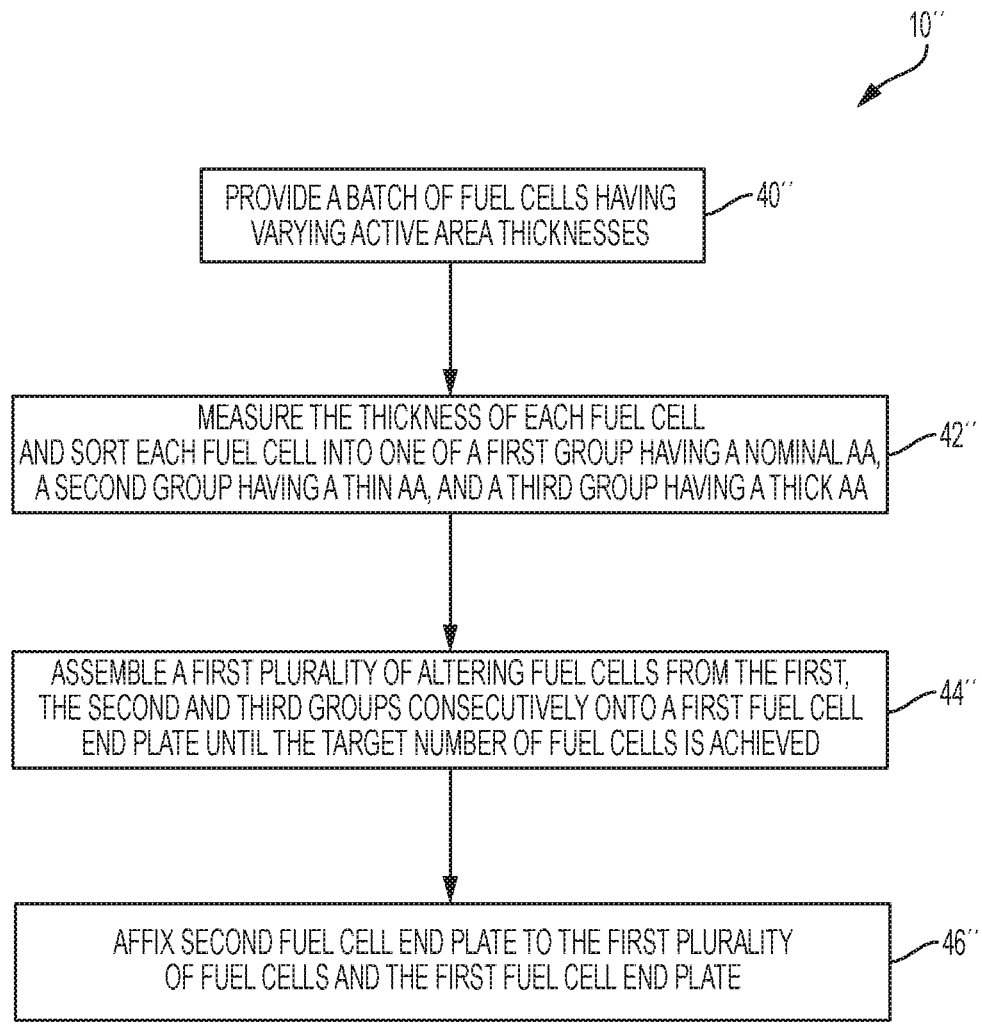
FIG. 3 is a flow chart which illustrates a second embodiment method of manufacturing a fuel cell stack in accordance with the present disclosure.
Figure 7:
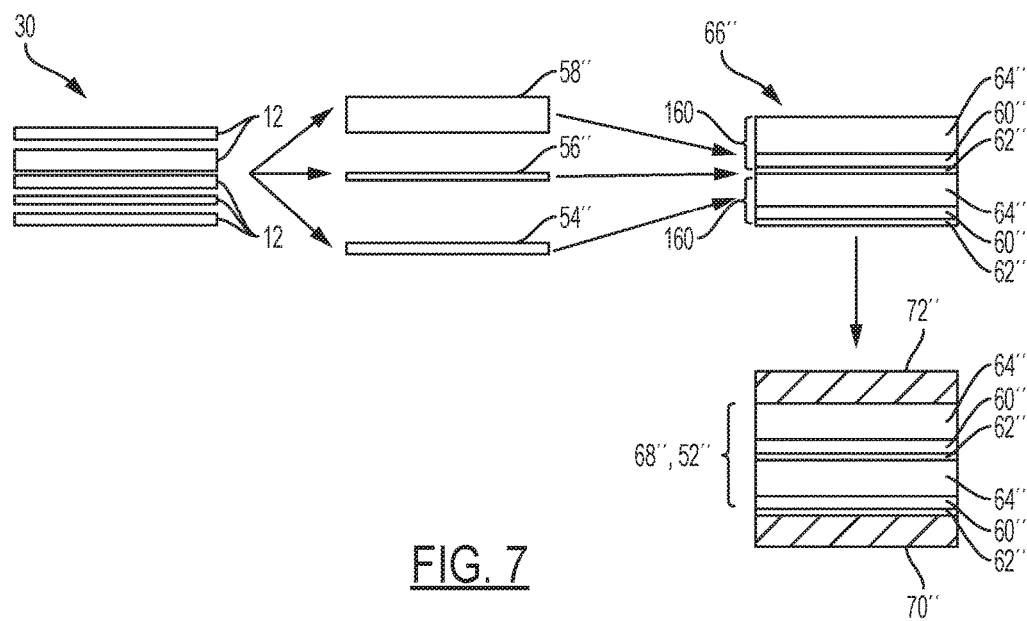
FIG. 7 is a schematic diagram illustrating an example fuel cell stack and the fuel cells assembled under the second embodiment method.

Referring now to FIG. 3, a second embodiment manufacturing method 10" of the present disclosure is shown in a flow chart form. FIG. 7 illustrates the fuel cells 12 and fuel cell stack 32" implemented under the second embodiment method 10" of FIG. 3. The first step 40" of the method 10" in FIG. 3 includes providing a batch of fuel cells each fuel cell in the batch of fuel cells having an active area thickness and a tolerance 15 for each active area thickness. The second step 42" includes measuring the thickness 14 of each fuel cell in the batch and sorting each fuel cell into one of a first group, a second group, or a third group. The first group of fuel cells may have an active area with a nominal thickness 14 in the range of −10 µm to about 10 µm. The second group of fuel cells may have an active area with a nominal thickness 14 in the range of −25 µm to about −10 µm, and the third group of fuel cells may have an active area with a nominal thickness 14 in the range of 10 µm to about 25 µm. Referring back to FIG. 3, the third step 44" of method 10" includes assembling a first plurality of fuel cells from the first, the second and the third groups in a repeated consecutive pattern (shown as element 160 in the non-limiting example of FIG. 7). The plurality of fuel cells from the first, second and third groups are assembled onto a first fuel cell end plate until the target number of fuel cells is achieved. The fourth step 46" includes affixing the second fuel cell end plate to the plurality of fuel cells and the first fuel cell end plate.

Referring now to FIG. 7, an example fuel cell stack 32" and the fuel cells implemented in method 10" are shown. The batch 30" of fuel cells 12 (having various active area thicknesses 14 and a tolerance 15 for each active area thickness) is divided into the first group (represented by element 54"), the second group (represented by element 56"), and the third group (represented by element 58"). Fuel cells 12 are then selected from the first, second and third groups 54, 56, 58 as described above in a repeated consecutive pattern 160 and assembled onto a first end plate 70" until the target number 52" of fuel cells is achieved. As shown, thin fuel cells 62" come from the second group 56" and thick fuel cells 64" come from the third group 58". Subsequently, as described above, the second end plate 72" is then affixed onto the plurality of assembled fuel cells 68" and the first end plate 70" as shown in FIG. 7.

Figure 4:
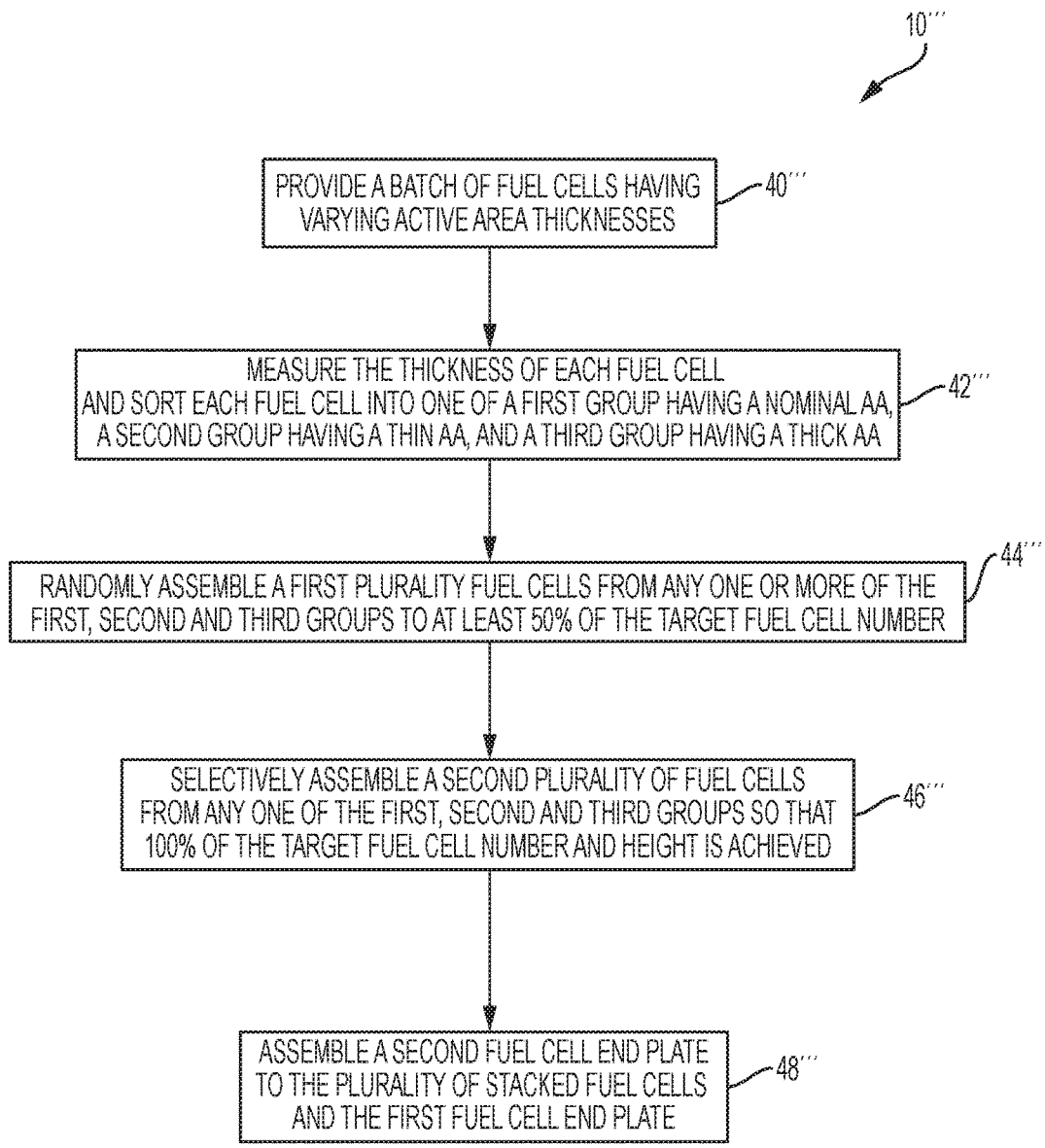
FIG. 4 is a flow chart which illustrates a third embodiment method of manufacturing a fuel cell stack in accordance with the present disclosure.
Figure 8:
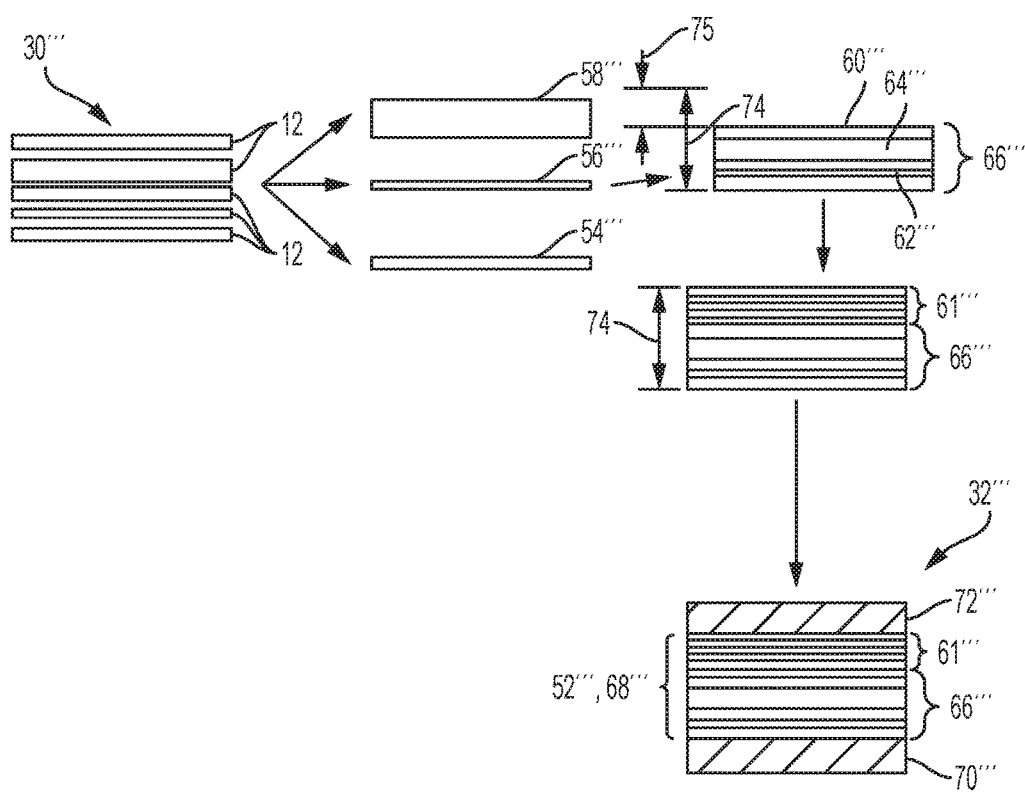
FIG. 8 is a schematic diagram illustrating an example fuel cell stack and the fuel cells assembled under the third embodiment method.

Referring now to FIG. 4, a third embodiment manufacturing method 10''' of the present disclosure is shown in a flow chart form. The fuel cells 12 and fuel cell stack 32''' under the third embodiment manufacturing method 10''' are shown in FIG. 8 of the present disclosure. Again, with respect to FIG. 4, the first step 40''' of the manufacturing method 10''' includes providing a batch of fuel cells each fuel cell having an active area thickness and a tolerance 15 for each active area thickness. The second step 42''' includes measuring the active area thickness of each fuel cell in the batch and sorting each fuel cell into one of a first group, a second group, and a third group. The first group 54''' (shown in FIG. 7) is defined by one or more fuel cells which have an active area thickness 14 in the range of −10 µm to about 10 µm. The second group 56''' (shown in FIG. 7) of fuel cells have an active area 16 in each fuel cell with a thickness 14 in the range of −25 µm to about −10 µm, and the third group 58''' of fuel cells have an active area 16 with a nominal thickness 14 in the range of 10 µm to about 25 µm. The third step 44''' includes randomly assembling a first plurality of fuel cells from any one or more of the first, second, and third groups on the first end plate such that the first plurality of fuel cells constitutes at least 50 percent of the target fuel cell number 52. The fourth step 46''' includes selectively assembling a second plurality of fuel cells for the stack from any one of the first, second, and third groups so that 100% of the target fuel cell numbers in the stack is achieved and target height (element 74 in FIG. 8) is achieved. The fifth step 48''' includes affixing a second fuel cell end plate to the plurality of assembled fuel cells and the first fuel cell end plate. It is understood that, with respect to all embodiments of the present disclosure, an example but non-limiting target (or desired) fuel cell number may fall within the range of 3 fuel cells to 100 fuel cells.

As shown in FIG. 8, the batch 30''' of fuel cells 12 (having an active area thickness 14, 14' and a tolerance 15 for each fuel cell in the batch 30) are divided into the first group (represented by element 54'''), the second group (represented by element 56'''), and the third group (represented by element 58'''). Fuel cells 12 are then selected from the first, second and third groups 54''', 56''', 58''' as described above and assembled onto a first end plate 70''' such that the first plurality 66''' of fuel cells constitutes at least 50% of the target number 52''' of fuel cells. Nominal fuel cells 60''' come from first group 54''', thin fuel cells 62''' come from the second group 56''' and thick fuel cells 64''' come from the third group 58'''. As previously described, a second plurality of fuel cells 61''' from at least the first, second and third groups 54''', 56''', 58''' are selectively assembled to the first plurality of fuel cells 66''' in a very careful manner until the target number 52''' and target height 74 (shown in FIG. 8) are achieved. The step of selectively assembling includes the step of determining a remaining target height 75 each time a new fuel cell is added to the second plurality 61''' of fuel cells. The target height 74 may, but not necessarily fall within the range of about 2 feet to about 4 feet. However, it is understood that the fuel cells must be assembled within +3 mm or −3 mm of the target height. As each new fuel cell is added to the second plurality of fuel cells 61''', the remaining target height 75 progressively decreases to zero. As described above, once the target height 75 is achieved and target number 52'''' are achieved, the second end plate 72''' may be affixed the plurality of assembled fuel cells 68''' and the first end plate 70''' as shown in FIG. 8. It is understood that with respect to all embodiments implementing a target height, an example, non-limiting predetermined target height may fall in the range from about 1 inch to about 4 feet.

Figure 5:
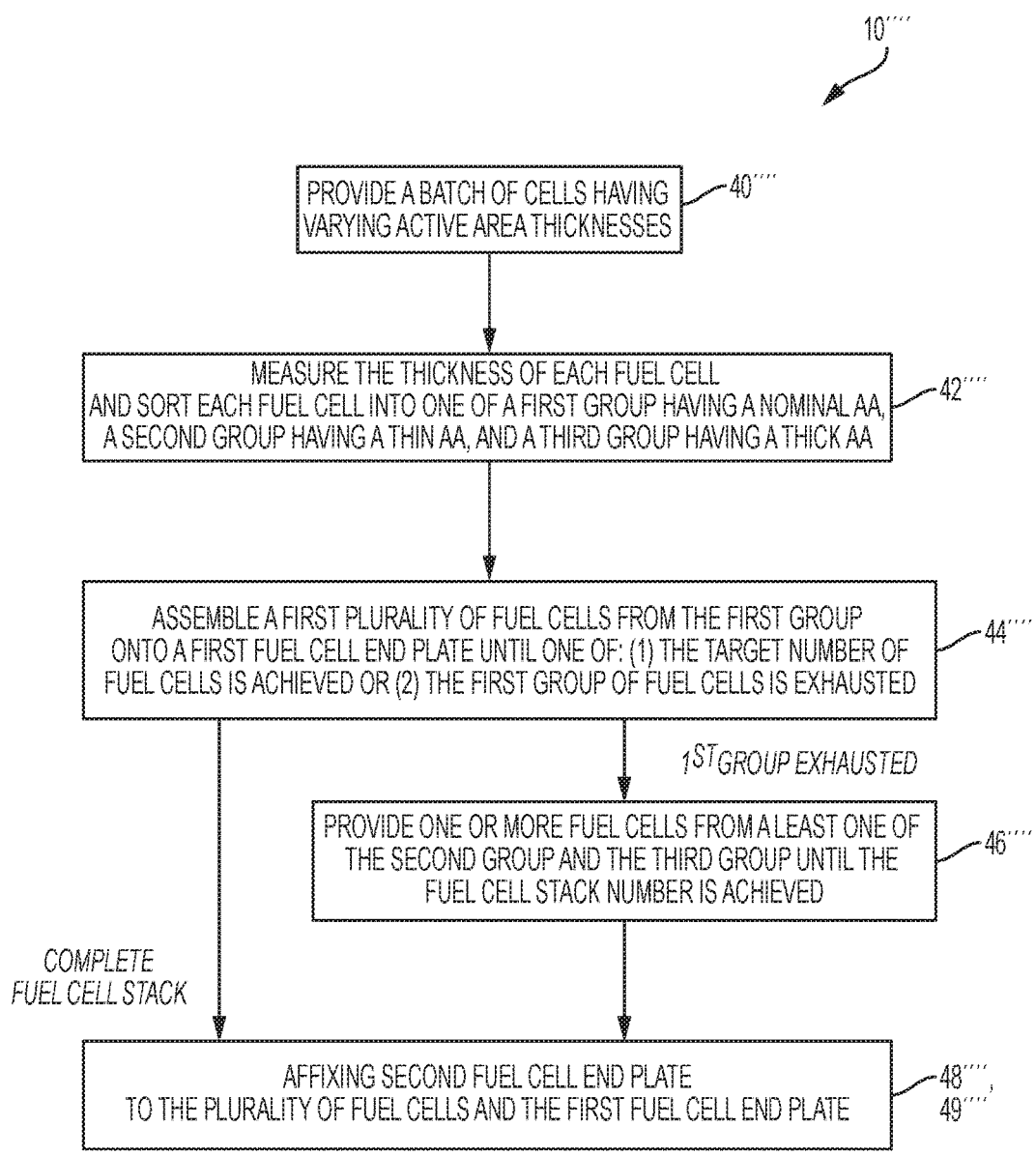
FIG. 5 is a flow chart which illustrates a fourth embodiment method of manufacturing a fuel cell stack in accordance with the present disclosure.

Referring now to FIG. 5, a fourth embodiment manufacturing method 10'''' of the present disclosure is shown in a flow chart form. Again, with respect to FIG. 5, the first step 40'''' of the manufacturing method includes providing a batch of fuel cells each fuel cell having an active area thickness 14 and a tolerance 15 for each active area thickness. The second step 42'''' includes measuring the active area thickness of each fuel cell in the batch and sorting/directing each fuel cell into one of a first group, a second group, and a third group. The first group is defined by one or more fuel cells which have an active area thickness 14 which falls in the tolerance 15 which may range from −10 µm to about 10 µm of the target active area thickness. An example, but non-limiting active area thickness 14 (without the bipolar plate included) may fall in the range of 0.5 mm to 2 mm. The second group of fuel cells have an active area with a nominal thickness 14 which falls in the range of −25 µm to about −10 µm relative to the target or desired active area thickness, and the third group of fuel cells have an active area with an active area thickness 14 in the tolerance range of 10 µm to about 25 µm greater than the target active area thickness. The third step 44'''' includes assembling a first plurality of fuel cells from the first group on a first fuel cell end plate until one of: (1) the target number of fuel cells is achieved, or (2) the first group of fuel cells is depleted of nominal fuel cells. Given that the first plurality of fuel cells are solely from the first group having nominal thickness, it is understood that the compression forces 35 and distances between the active areas for each nominal fuel cell 60"" (shown in FIG. 9) in the first plurality of fuel cells may be substantially constant with minimal variation. In the event the first plurality of fuel cells has achieved the target number of fuel cells, then the fourth step 48"" includes affixing a second fuel cell end plate to the first plurality of fuel cells and the first fuel cell end plate. Alternatively, in the event that the first plurality of fuel cells has not achieved the target number of fuel cells for the stack and the first group of fuel cells has been depleted such that there are no fuel cells remaining in the first group, then the alternative fourth step 46"" includes providing one or more fuel cells from at least one of the second group and third group until the target fuel cell stack number is achieved and then the alternative fifth step 49"" (following from step 46''') includes affixing a second fuel cell end plate to the plurality of fuel cells and the first fuel cell end plate. It is preferable, but not necessary, to alternate between thick and thin fuel cells (when both are used) in the second plurality 61"" of fuel cells to ensure a fairly even distribution of compression forces 35 across the stack 32.

With reference to FIG. 9, example fuel cell stacks 80 and 82 and fuel cells 12 implemented under the method 10"" of FIG. 5 are shown. The batch 30"" of fuel cells 12 (having various active area thicknesses 14) is divided into the first group (represented by element 54""), the second group (represented by element 56""), and the third group (represented by element 58""). Nominal fuel cells 60"" from the first group 54"" are assembled as a first plurality of fuel cells 66"" onto a first end plate 70"" as described above until either: (1) the target number 52"" of fuel cells is achieved; or (2) the first group 54"" is depleted of all nominal fuel cells 60"". In the event the target number 52"" of fuel cells is achieved via the first plurality of fuel cells 66"", the second end plate 72"" is affixed to the first plurality of fuel cells 66"" and the first end plate 70"" thereby forming fuel cell stack 80. However, as described above, in the alternative event the first group 54"" is depleted of all nominal fuel cells 60"" before the target number is achieved, then fuel cells 62"", 64"" will be added from the second and third groups (preferably in an alternating fashion) as the second plurality of fuel cells 61"" until the target number 52"" of fuel cells is achieved. Again, once the target number 52"" is achieved, the second end plate 72"" is affixed to the target number 52"" of fuel cells and the first end plate 70"" thereby forming fuel cell stack 82.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for assembling a fuel cell stack, the method comprising the steps of:
providing a batch of fuel cells, each fuel cell in the batch of fuel cells having an active area thickness and a tolerance for the active area thickness;
measuring the active area thickness for each fuel cell in the batch of fuel cells and sorting each fuel cell in the batch of fuel cells into one of a first group, a second group, and a third group based on the active area thickness for each fuel cell;
assembling a target number of fuel cells to a target height from at least one of the first, second and third groups onto a first end plate; and
affixing a second end plate to the target number of fuel cells and the first end plate thereby creating a fuel cell stack.

2. The method as defined by claim 1 wherein the step of measuring and sorting includes the step of directing a nominal fuel cell to the first group, directing a thin fuel cell to the second group, and directing a thick fuel cell to the third group.

3. The method as defined by claim 2 wherein the step of assembling the target number of fuel cells includes the step of alternating thick and thin fuel cells onto the first end plate.

4. The method as defined by claim 2 wherein the step of assembling the target number of fuel cells includes the step of providing thick, nominal and thin fuel cells in a repeated consecutive pattern onto the first end plate.

5. The method as defined by claim 2 wherein the step of assembling the target number of fuel cells includes the step of providing a plurality of nominal fuel cells adjacent to one another onto the first end plate.

6. The method as defined by claim 3 wherein the tolerance of the active area thickness for each nominal fuel cell falls in a range of about −10 µm to about 10 µm, the tolerance of the active area thickness for each thin fuel cell falls in a range of about −25 µm to about −10 µm, and the tolerance of the active area thickness for each thick fuel cell falls in a range of about 10 µm to about 25 µm.

7. The method as defined by claim 4 wherein the active area thickness for each nominal fuel cell has the tolerance which falls in a range of about −10 µm to about 10 µm, the active area thickness for each thin fuel cell has the tolerance which falls in a range of about −25 µm to about −10 µm, and the active area thickness for each thick fuel cell has the tolerance that falls in a range of about 10 µm to about 25 µm.

8. The method as defined by claim 5 wherein the tolerance for each active area thickness for each nominal fuel cell falls in a range of about −10 µm to about 10 µm, the tolerance for each active area thickness for each thin fuel cell falls in a range of about −25 µm to about −10 µm, and the tolerance for active area thickness for each thick fuel cell falls in a range of about 10 µm to about 25 µm.

9. A method for assembling a fuel cell stack, the method comprising the steps of:
providing a batch of fuel cells, each fuel cell in the batch of fuel cells having an active area thickness and a tolerance for the active area thickness;
measuring the active area thickness for each fuel cell in the batch of fuel cells and sorting each fuel cell into one of a first group, a second group, and a third group;
assembling a first plurality of fuel cells from any one of the first, second and third groups onto a first end plate until at least one of the first, second and third groups is depleted;
assembling a second plurality of fuel cells to the first plurality of fuel cells until a target number of fuel cells is achieved, the second plurality of fuel cells being formed from any one of the first, second and third groups of fuel cells; and affixing a second end plate to the target number of fuel cells and the first end plate thereby creating a fuel cell stack.

10. The method as defined by claim 9 wherein the step of measuring and sorting includes the step of directing a nominal fuel cell to the first group, directing a thin fuel cell to the second group, and directing a thick fuel cell to the third group.

11. The method as defined in claim 10 wherein the first plurality of fuel cells is formed from alternating thin and thick fuel cells, and the second plurality of fuel cells is composed of nominal fuel cells.

12. The method as defined in claim 10 wherein the first plurality of fuel cells is formed solely from a plurality of nominal fuel cells, and the second plurality of fuel cells is formed from at least one of a thin fuel cell and a thick fuel cell.

13. The method as defined in claim 11 wherein the second group is defined by at least one fuel cell having the a thin active area thickness which the tolerance falls in a range of about −25 μm to about −10 μm, and the third group is defined by at least one fuel cell having a thick active area thickness of which the tolerance falls within a range of about 10 μm to about 25 μm.

14. The method as defined in claim 12 wherein the second group is defined by at least one fuel cell having a thin active area thickness with a tolerance which falls in a range of about −25 μm to about −10 μm, and the third group is defined by at least one fuel cell having a thick active area thickness with a tolerance which falls in the range of about 10 μm to about 25 μm.

15. The method as defined in claim 12 wherein the step of assembling the second plurality of fuel cells onto the first plurality of fuel cells includes the step of alternating thin and thick fuel cells in a consecutive pattern within the second plurality of fuel cells.

16. A method for assembling a fuel cell stack, the method comprising the steps of:

providing a batch of fuel cells, each fuel cell in the batch of fuel cells having an active area thickness and a tolerance for the active area thickness;

measuring the active area thickness for each fuel cell in the batch of fuel cells and sorting each fuel cell into one of a first group, a second group, and a third group;

randomly assembling a first plurality of fuel cells from any one or more of the first, second and third groups onto a first end plate until at least 50 percent of a target number of fuel cells is achieved;

selectively assembling a second plurality of fuel cells to the first plurality of fuel cells until 100 percent of the target number of fuel cells is achieved and a target height is achieved, the second plurality of fuel cells being formed from one or more fuel cells from each the first, second and third groups of fuel cells; and affixing a second end plate to the target number of fuel cells and the first end plate thereby creating a fuel cell stack.

17. The method as defined in claim 16 wherein the step of selectively assembling the second plurality of fuel cells includes the step of measuring a remaining target height each time a new fuel cell is added to the second plurality of fuel cells.

* * * * *